United States Patent Office 3,384,907
Patented May 28, 1968

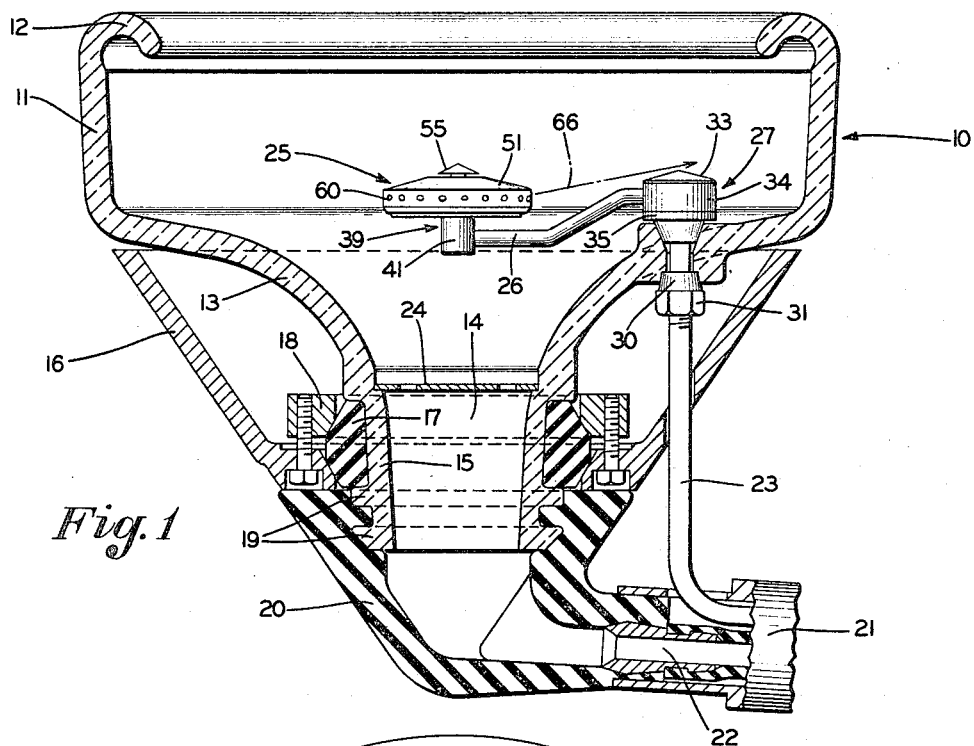
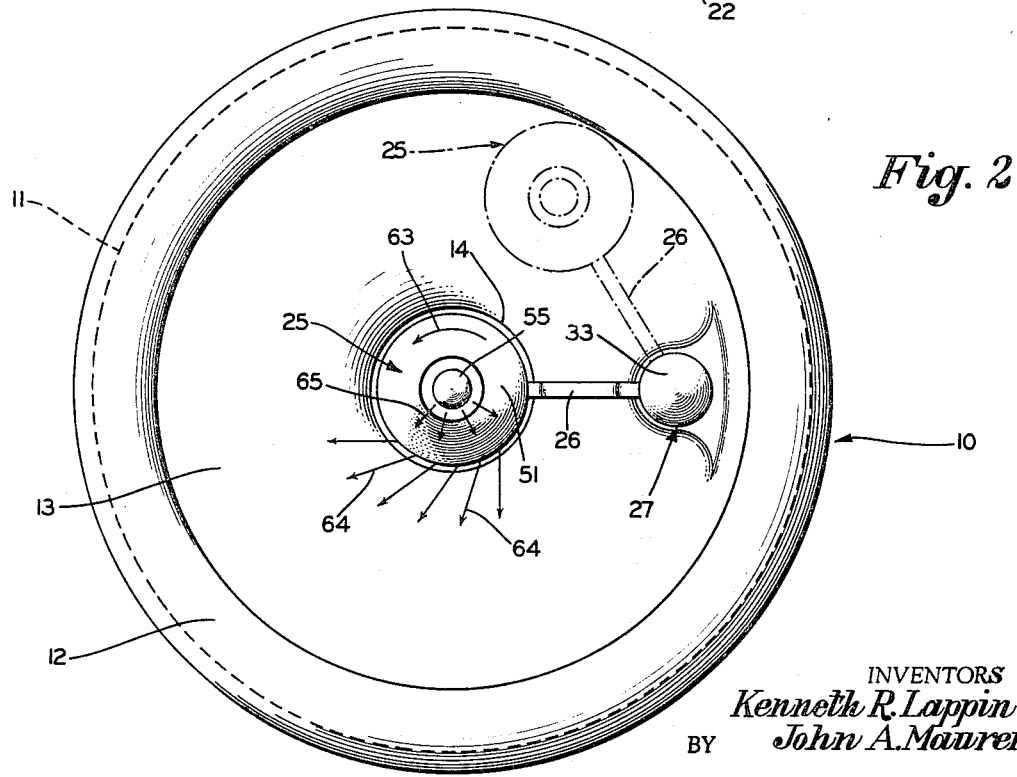
INVENTORS
Kenneth R. Lappin
John A. Maurer
BY
Freese, Bishop & Schick
ATTORNEYS

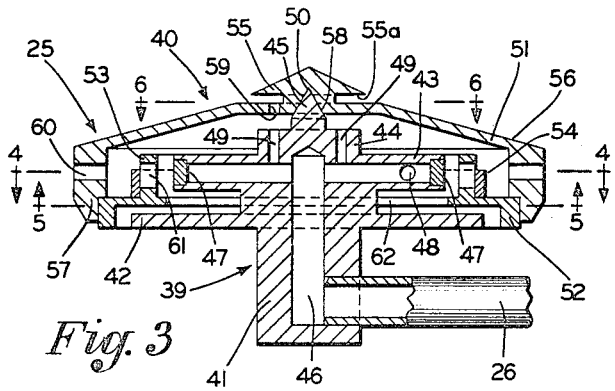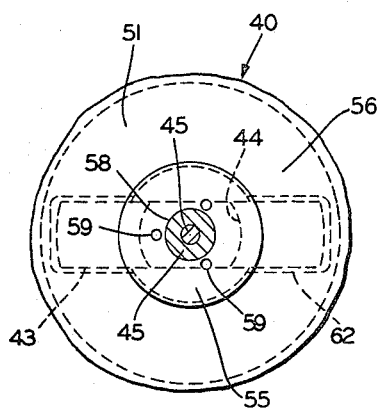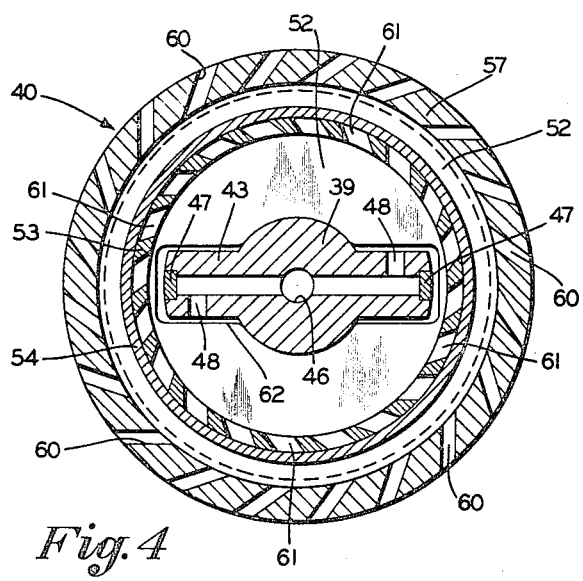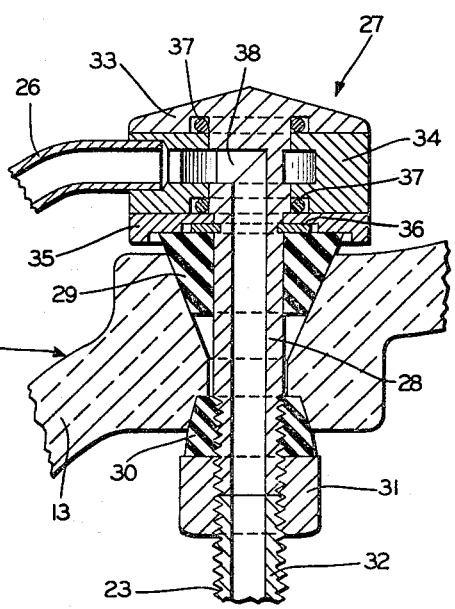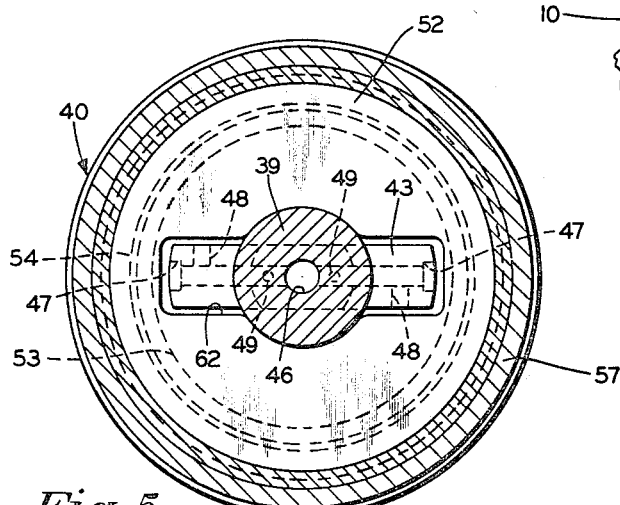

3,384,907
DENTAL BOWL FLUSHER CONSTRUCTION
Kenneth R. Lappin and John A. Maurer, Canton, Ohio, assignors to The Weber Dental Manufacturing Company, Canton, Ohio, a corporation of Ohio
Filed Feb. 11, 1966, Ser. No. 526,777
15 Claims. (Cl. 4—264)

Our invention relates generally to improvements in dental bowl flusher constructions, and more specifically, to a flusher construction which insures that the dental bowl will be maintained properly cleansed at all times and particularly as free as possible from expectorates of dental patients as well as the other usual materials deposited therein.

Probably the most usual form of dental bowl flushing apparatus consists of merely a metal water tube positioned around the inner side of the dental bowl near or beneath the top rim thereof. This water tube is directed such that a stream of water is projected generally circumferentially around the bowl inner side with the water flowing ultimately downwardly through a center bottom drain.

The principal difficulty with this prior form of flusher construction is that it is impossible with merely a single water tube of this form to completely cover and flush the lower portion of the dental bowl into which the expectorates and other materials, might be deposited. Furthermore, a relatively large inner bowl area is involved, and it is impossible to provide the water from the water tube with sufficient force and velocity so as to, in many cases, properly clean many surface areas, even though the water from the tube reaches and passes over these areas.

Various other forms of flusher constructions have been proposed, certain of which have included some form of spray device positioned centrally of the bowl for spraying water in all radial directions toward the inner bowl sidewall. These proposed constructions, however, have been quite complicated and expensive. Also, the constructions of this form have been relatively large, blocking off a relatively large portion of the bowl inner surface, so that a large portion of the material deposited in the bowl strikes and deposits on these central sprayers so as to defeat the prime purpose of the entire device.

Still a further problem with these proposed constructions of the central sprayer type is that they necessarily overlie the central drain at the lower portion of the bowl. It is common practice to provide this central bowl drain with various forms of gold and silver traps so that it is necessary from time to time to service and empty these traps. With the central spray directly overlying the bowl drain and trap, the proper servicing of the trap is made exceedingly difficult, and in many cases completely impossible.

It is, therefore, general objects of the present invention to provide an improved dental bowl flusher construction of the central spray type which properly and quickly cleanses the inner surface of the dental bowl of expectorates and other materials deposited therein; which provides a central spray pattern radially outwardly to the sidewalls of the bowl having the necessary force and velocity, as well as bowl surface area coverage, to properly accomplish efficient cleansing and flushing thereof; which is uniquely constructed for maintaining the exposed surface area of the flusher itself properly cleansed and flushed at all times; which may be mounted suspended from a portion of the bowl sidewall for pivotal movement between the normal central spraying position directly overlying the bowl drain and trap and a side position fully exposing the drain and trap for convenient servicing of the trap; which, despite all of the foregoing advantages, is relatively small in relationship to the dental bowl so as to expose a maximum inner surface area of the bowl; and which satisfies all of the foregoing objects in a relatively simple and efficient manner, is relatively simple in construction, and may be provided at a reasonable construction cost.

These and other objects are accomplished by the parts, constructions, arrangements, combinations and subcombinations comprising the present invention, a preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms, the dental bowl flusher construction comprising the present invention may be stated as including a normally centrally located rotating spray-type bowl flusher, radially pivotally mounted through a generally radially extending support arm to the sidewall portion of a dental bowl, with this support arm also serving as the water supply tube to the sprayer and requiring the pivotal connection to the bowl sidewall to be a water transmitting pivotal connection.

Generally, the spray-type flusher per se comprises a stationary fluid jet head having horizontal jet spray means, preferably in the form of a horizontal arm having a pair of horizontally directed fluid jets, vertical jet means, preferably in the form of a pair of somewhat centrally located fluid jets, a bottom cover plate, and a spray head support, preferably in the form of a needle support. Furthermore, the flusher per se comprises a rotating fluid spray head having a jet bucket ring effectively horizontally aligned with the stationary head horizontal jet means providing rotation to the rotating spray head relative to the stationary jet head, a jet deflector ring positioned immediately radially outwardly of the jet bucket ring and partially interfering or covering the jets of the jet bucket ring for producing the proper forces for the rotation of the rotating spray head, a preferably conical jet spray cover formed with a series of horizontal jets through a vertical flange portion thereof for receiving the fluid from the jet bucket ring therethrough in a generally horizontal spray, and a series of generally centrally located vertical jets communicating upwardly to beneath the undersurface of a deflector dome generally vertically aligned with the stationary head vertical jet means for receiving fluid from the stationary head vertical jet means upwardly therethrough and deflected by the deflector dome means flow outwardly and downwardly over the outer conical surface of the conical jet spray cover, a bottom cover plate having key slot means formed therein to facilitate removal of the rotating spray head from the stationary jet head, and a needle receiving support socket for receiving the needle support of the stationary jet head to thereby rotatably support the rotating spray head on and over the stationary jet head.

With this unique flusher construction, therefore, not only does the horizontal jet means of the stationary jet head serve to rotate the spray head relative to this stationary jet head but also serves to provide a horizontal spray from the rotating spray head generally radially outwardly from the flusher to cleanse the dental bowl. At the same time, the vertical jet means of the stationary jet head still further serves to cleanse the outer conical surface of the rotating spray head so as to maintain the flusher clean despite its central location in the dental bowl.

By way of example an embodiment of the dental bowl flusher construction of the present invention is illustrated in the accompanying drawings forming a part hereof, wherein like numerals indicate similar parts throughout the several views, and in which:

FIG. 1 is a fragmentary vertical section, part in elevation, illustrating a usual dental bowl having the bowl flusher construction of the present invention operably mounted therein;

FIG. 2, a top plan view of the bowl and flusher of FIG. 1;

FIG. 3, an enlarged fragmentary vertical section, part in elevation, of the flusher construction of FIG. 1;

FIG. 4, a sectional view, part in elevation, looking in the direction of the arrows 4—4 in FIG. 3;

FIG. 5, a sectional view, part in elevation, looking in the direction of the arrows 5—5 in FIG. 3;

FIG. 6, an enlarged fragmentary sectional view, part in elevation, looking in the direction of the arrows 6—6 in FIG. 3; and FIG. 7, an enlarged fragmentary vertical section through the pivotal connection of the flusher construction to the dental bowl, shown in side elevation in FIG. 1 and top plan in FIG. 2.

Referring to FIGS. 1 and 2, the bowl flusher construction of the present invention is mounted in a usual dental bowl, generally indicated at 10, having the cylindrical vertical sidewall 11 with the top arcuate flange 12, the integral lower arcuate sidewall 13 forming the bottom drain opening 14, and the integral mounting neck 15. As stated, this bowl 10 may be of usual construction and formed of the usual materials with a decorative cover ring 16 mounted thereon surrounding a part of the bowl lower sidewall 13 and mounting neck 15, as shown, and with this cover ring being secured to the bowl 10 through a resilient gasket 17 and fastening ring 18.

Furthermore, the entire assembly of the bowl 10 is supported through a pair of flanges 19 on the right angle resilient material drain neck 20. Drain neck 20 is in turn supported on a service pipe 21 and communicates with a drain line 22, with this service pipe 21 also enclosing the water inlet line 23 to provide the water supply for the flusher construction mounted on and in bowl 10.

Also, the bowl bottom drain opening 14 may be provided with the usual perforate strainer 24 positioned at the upper extremity of the mounting neck 15. Within this mounting neck 15 may be enclosed the usual gold and silver trap (not shown) so as to recover gold and silver flushed through the strainer 24.

The flusher construction of the present invention per se is indicated generally at 25, normally supported centrally within the bowl 10 and overlying the bottom drain opening 14 and strainer 24 by the support and water tube 26 and radially pivotal support connection, generally indicated at 27. As shown in FIGS. 1 and 2 and in enlarged detail in FIG. 7, the support connection 27 is mounted vertically through an upper portion of the bowl lower sidewall 13 by means of the vertical mounting tube 28 telescoped within the upper and lower resilient gaskets 29 and 30, said gaskets being axially compressed by the mounting nut 31. The mounting nut 31 also secures the upper end portion 32 of the water inlet line 23 in communication with the lower end of this mounting tube 28.

The upper end of the mounting tube 28 is formed with the radial flange 33 which overlies a generally cylindrical and circumferentially rotatable connector 34, and the fastening ring 35 underlies this connector 34, all of which is retained in assembly by the usual snap ring 36. Usual sealing rings 37 are provided above and below the connector 34 so that connector 34 is rotatable axially between the mounting tube flange 33 and fastening ring 35, and is provided with a water opening 38 therein communicating at right angles to the mounting tube 28 and the support and water tube 26, as clearly shown in FIG. 7.

The support and water tube 26 is secured generally radially into the rotatable connector 34 of this support connection 27 so that there is a water communication from the inlet line 23 through the end portion 32 thereof, through the mounting tube 28 of support connection 27, through the rotatable connector 34 of the support connection, and into the support and water tube 26. Further, this water communication for the supply of water therethrough remains at all times despite the rotatable positioning of the rotatable connector 34 and the support and water tube 26. At the same time, this support connection 27 being secured on the bowl 10 not only provides this rotatable water connection into the support and water tube 26, but also serves to securely support this support and water tube 26 and the flusher 25 connected thereto.

As shown in FIG. 1, the support and water tube 26 projects generally radially into the central area of the bowl 10 and is secured to and supporting flusher 25. As shown in FIG. 2, the central positioning of the flusher 25 is the normal position as will appear more clearly later, but due to the rotatable mounting just described by the support connection 27, the support and water tube 26 with the flusher 25 may be pivoted to a side position, indicated by the broken lines in FIG. 2, so that the flusher 25 will no longer overlie the bowl bottom drain opening 14, the strainer 24 covering this opening and any gold and silver trap that may be located beneath the strainer. This thereby provides free access to the bowl bottom drain opening for proper servicing thereof.

Referring to FIGS. 3 through 6, the flusher 25 is formed by a stationary fluid jet head, generally indicated at 39, which is virtually vertically telescoped by and rotatably mounts a rotating fluid spray head, generally indicated at 40. Furthermore, the inner end of the support and water tube 26 is secured communicating radially into the stationary fluid jet head 39 so as to support the entire flusher 25.

The stationary fluid jet head 39 includes a generally cylindrical lower mounting portion 41 vertically connected to a bottom cover plate 42, a generally horizontal jet arm 43, an upper hub portion 44, and a needle support portion 45. As shown particularly in FIG. 3, the lower mounting portion 44 has a water supply opening 46 extending vertically upwardly therethrough from and in communication with the support and water tube 26, which water supply opening 46 also extends upwardly centrally through the bottom cover plate 42 and into the jet arm 43.

The jet arm 43 is formed spaced above the bottom cover plate 42 extending horizontally and equally in opposite radial directions. Furthermore, this jet arm 43 is horizontally hollow, has each of the extremities thereof closed by the plugs 47, and has a horizontal jet opening 48 formed into the inner opening thereof adjacent each of the extremities, but at opposite sides, as best seen in FIG. 4.

The upper hub portion 44 centrally overlies the jet arm 43 and is formed with a pair of diametrically opposite vertical jet openings 49 which communicate through the upper hub portion 44 and also communicate with the inner confines or opening of the jet arm 43.

Finally, the needle support portion 45 of this stationary fluid jet head 39 centrally overlies the upper hub portion 44 and is formed at the upper extremities thereof with a conical needle support 50. It will be seen at a later point that the horizontal and vertical jet openings 48 and 49 are relatively precisely positioned circumferentially aligned in a vertical direction, in order to accomplish proper functioning of the flusher 25.

The rotating fluid spray head, generally indicated at 40, includes an outer conical jet spray cover 51, a bottom cover plate 52, a jet bucket ring 54, and a jet deflector ring 54. Furthermore, as best seen in FIG. 3, the jet spray cover 51 is formed at the top outer side thereof with the central deflector dome 55, the outer conical surface 56, and the extreme outer downwardly projecting vertical flange 57.

As clearly shown in FIG. 3, the deflector dome 55 is formed relatively small compared to the remainder of the jet spray cover 51 and is undercut at the edges thereof an appreciable distance radially inwardly completely around the circumference thereof so as to have an undersurface 55a. Furthermore, a needle receiving support socket 58 is formed centrally of the jet spray cover 51 projecting partially upwardly into the deflector dome 55.

Still further, a series of vertical jet openings 59, preferably three in number, are formed vertically and on a common curcumference through the jet spray cover 51 directly beneath and spaced downwardly from the undersurface 55a of the deflector dome 55, the precise positioning of these vertical jet openings 59 to be hereinafter discussed. Also, a large series of horizontally extending and equally circumferentially spaced jet openings 60 are formed at a common radial angle through the vertical flange 57 of this jet spray cover 51, again the precise alignment thereof to be hereinafter discussed.

The bottom cover plate 52 is secured at the inner edge of the cover vertical flange 57 and supports the jet bucket ring 53 spaced radially inwardly from the vertical flange 57. This jet bucket ring 53 is formed with a large series of circumferentially equally spaced, horizontal jet openings 61 therethrough, which openings are equal in number to the jet openings 60 of the cover vertical flange 57 but angle in an opposite circumferential direction to the jet openings 60.

As can be seen in FIG. 4, the jet openings 61 through the jet bucket ring 53 are slightly larger in diameter than the jet openings 60 through the cover vertical flange 57. The outer ends of the jet openings 61 in the jet bucket ring 53, are however, substantially radially aligned with the inner ends with the jet openings 60 in the cover vertical flange 57.

The jet deflector ring 54 is secured telescoped outwardly over the jet bucket ring 53 and partially covering the jet openings 61 of this jet bucket ring. The purpose of this jet deflector ring 54 is to restrict the jet openings 61, thereby restricting the passage of water therethrough and regulating the rotation of the rotating fluid spray head 40, as will appear more clearly later.

Finally, radially inwardly of the jet bucket ring 53, the bottom cover plate 52 is formed with a diametrically extending key slot 62 vertically therethrough. This key slot 62 is of slightly enlarged dimensions sufficient for the passage of the stationary head jet arm 43 therethrough when this slot and arm are rotatably vertically aligned.

Thus, the rotating fluid spray head 40 may be telescoped vertically downwardly over the stationary fluid jet head 39 merely by aligning the key slot 62 of rotating head 40 with the jet arm 43 of stationary head 39 and the needle support 50 of stationary head 39 may be received in the needle receiving support socket 58 of the rotating head 40, thereby rotatably supporting the rotating head 40 on the stationary head 39 in the position clearly shown in FIG. 3. Note in this assembly, the horizontal jet openings 48 of the stationary head jet arm 43 are horizontally aligned with the vertical flange jet openings 60 and jet bucket ring jet openings 61 of the rotating head 40. Also note that the upper hub portion vertical jet openings 49 of stationary head 39 are precisely vertically aligned on the same circumference as the jet spray cover vertical jet openings 59 beneath the deflector dome 55 of the rotating head 40.

Thus, water flowing under pressure inwardly through the support and water tube 26 flows through the water supply opening 46 of the stationary head lower mounting portion 41, upwardly through the stationary head bottom cover plate 42 and into the stationary head jet arm 43. Once in the stationary head jet arm 43, the water flows both horizontally through the horizontal jet openings 48 of jet arm 43 and vertically through the vertical jet openings 49 of the upper hub portion 44.

The water flowing or jetting horizontally from the horizontal jet openings 48 of the stationary jet arm 43 passes through the jet bucket ring jet openings 61 of the rotating head 40 and, since these jet openings 61 are angled, and with the aid of the proper restriction as provided by the jet deflector ring 54, the rotating fluid spray head 40 will rotate relative to the stationary fluid jet head 39 in the direction indicated by the arrow 63 in FIG. 2. At the same time, and as controlled by centrifugal force caused by the rotation of this rotating head 40, the water will pass radially outwardly from the jet bucket ring jet openings 61 to and through the oppositely angled vertical flange jet openings 60 of this rotating head 40, so as to spray outwardly from the flusher 25, as indicated by the arrows 64 in FIG. 2, to finally spray outwardly against the vertical and lower sidewalls 11 and 13 of the bowl 10, flushing the inner surface of this bowl and ultimately flowing downwardly through the strainer 24 and outwardly through the drain line 22.

Still at the same time, a part of the water entering the stationary head jet arm 43 flows or jets upwardly through the vertical jet openings 49 of the stationary head upper hub portion 44 and, again due to the rotation of the rotating head 40, a portion of this water jets upwardly through the rotating head vertical jet openings 59 to beneath and against the undersurface 55a of the rotating head deflector dome 55. From the deflector dome 55, this water is deflected horizontally and flows downwardly along the conical surface 56 of the rotating head jet spray cover 51 to ultimately also be sprayed outwardly away from the flusher 25 and against the bowl vertical and lower sidewalls 11 and 13, as indicated by the arrows 65 in FIG. 2.

Furthermore, the water spraying from the rotating head 40 through the vertical flange jet openings 60 will broaden horizontally in spray pattern as this water progresses toward the bowl vertical and lower sidewalls 11 and 13, so as to likewise maintain the upwardly exposed portions of the support and water tube 26 and the support connection 27 thoroughly flushed and cleansed, as indicated by the arrow 66 in FIG. 1.

Thus, according to the bowl flusher construction of the present invention, a central spray-type flusher is provided which properly and quickly cleanses the inner surfaces of the dental bowl of expectorates and other materials deposited therein, as accomplished by the generally horizontal rotating spray from the horizontal jet openings 60 of the rotating fluid spray head 40. Furthermore, this rotating central spray pattern radially outwardly from these jet openings 60 in the rotating fluid spray head 40 strikes a large surface area of the bowl sidewalls 11 and 13 of bowl 10 with the necessary force and velocity, as well as bowl surface area coverage, to properly accomplish efficient cleansing and flushing.

Still further, according to the principles of the present invention, this rotating flusher 25 is uniquely constructed by virtue of the vertical jet openings 59 beneath the deflector dome 55 of the rotating fluid spray head 40 so as to maintain the entire exposed surface area of the flusher properly cleansed and flushed at all times, by providing a flow of water at all times downwardly along the conical surface 56 of this rotating head. Also, the flusher 25 is mounted suspended by the support and water tube 26 from a portion of the bowl sidewall 13 for pivotal movement through the support connection 27 between the normal central spraying position directly overlying the bowl bottom drain opening 14 and strainer 24, as well as any gold and silver trap which may be positioned therein, and a side position in which the flusher 24 does not overlie the bowl bottom drain opening 14, but rather fully exposes this bottom drain opening for proper and convenient servicing of the strainer 24 and the trap.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art set forth in the appended claims.

We claim:

1. Dental bowl flusher construction including a dental bowl having sidewalls and a bottom drain opening, a water jet head, support means operably connected to the water jet head for supporting said head in a normal position spaced above and overlying the bowl bottom drain opening with the support means extending generally horizontally to the bowl sidewalls, connection means operably connected to the support means at the bowl sidewalls for supporting the water jet head and support means on the bowl sidewalls and selectively pivotal horizontally from the water jet spray normal position directly overlying the bowl bottom drain opening to a position at least partially vertically exposing said bowl bottom drain opening, and water supply means operably connected to the water jet head for directing water to and generally radially from said water jet head against the bowl sidewalls.

2. Dental bowl flusher construction as defined in claim 1 in which the support means is a generally horizontally extending support tube and the hollow interior thereof forms a part of the water supply means for directing water to and from the water jet head.

3. Dental bowl flusher construction as defined in claim 1 in which the support means is a generally horizontally extending support tube and the hollow interior thereof forms a part of the water supply means for directing water to and from the water jet head, in which the connection means includes a water passage therethrough communicating with the support tube constructed and arranged for maintaining said water passage in communication with the support tube in all positions of horizontal rotation of the support means and water jet head, and in which the connection means water passage forms a part of the water supply means.

4. Dental bowl flusher construction for mounting in a dental bowl to flush the sidewalls thereof including a stationary head, a rotating head telescoped over the stationary head, means rotatably mounting the rotating head on the stationary head, means mounting the stationary head in a dental bowl, horizontal jet means on the stationary head for spraying jets of water horizontally toward the rotating head, horizontal jet spray means on the rotating head for receiving the jets of water sprayed from the stationary head therethrough to rotate the rotating head relative to the stationary head and at the same time spray water radially outwardly from the rotating head in all directions against sidewalls of the bowl, vertical jet spray means on the stationary head for spraying jets of water centrally and vertically against the rotating head, vertical jet spray means through a central portion of the rotating head circumferentially aligned in a vertical direction with the vertical jet spray means of the stationary head for receiving water therethrough to flow said water outwardly over surfaces of the rotating head and from said rotating head outwardly against the bowl sidewalls, and means for supplying water under pressure to the stationary head.

5. Dental bowl flusher construction as defined in claim 4 in which the stationary head includes a stationary generally horizontally extending jet arm; in which the horizontal jet means on the stationary head includes at least a pair of horizontal jet openings directed in opposite horizontal directions in the jet arm; in which the rotating head includes a ring-like vertical flange; and in which the horizontal jet spray means on the rotating head includes a series of circumferentially equally spaced generally horizontally extending jet openings through the rotating head vertical flange.

6. Dental bowl flusher construction as defined in claim 4 in which the rotating head includes a jet bucket ring, and a ring-like vertical flange spaced radially outwardly from and circumferentially surrounding the jet bucket ring; in which the horizontal jet spray means on the rotating head includes a series of circumferentially equally spaced generally horizontally extending jet openings formed through the jet bucket ring, and a series of circumferentially equally spaced generally horizontal extending jet openings formed through the vertical flange.

7. Dental bowl flusher construction as defined in claim 6 in which the jet openings in the rotating head jet bucket ring are angled from a straight radial line in one circumferential direction; and in which the jet openings in the rotating head flange are angled from a straight radial line in a circumferential direction opposite from said one circumferential direction.

8. Dental bowl flusher construction as defined in claim 6 in which a deflector ring is positioned radially outward of the rotating head jet bucket ring partially covering the jet openings of the jet bucket ring.

9. Dental bowl flusher construction as defined in claim 6 in which the stationary head includes a stationary horizontally extending jet arm; and in which the horizontal jet means on the stationary head includes at least a pair of jet openings in said jet arm directed in opposite horizontal directions.

10. Dental bowl flusher construction as defined in claim 4 in which the vertical jet spray means on the stationary head includes at least a pair of generally vertically extending jet openings; and in which the vertical jet spray means through a central portion of the rotating head includes a series of at least three circumferentially spaced generally vertically extending jet openings through said central portion.

11. Dental bowl flusher construction as defined in claim 10 in which the rotating head has a generally conical upper surface and a central dome having an undersurface spaced above said conical surface; in which the series of jet openings of the vertical jet spray means through a central portion of the rotating head each opens spaced beneath said dome undersurface; and in which the water flowing through the rotating head vertical jet spray means flows through said vertical jet openings and against said dome undersurface, is deflected by said dome undersurface radially outwardly and flows downwardly over said conical upper surface.

12. Dental bowl flusher construction as defined in claim 4 in which the rotating head includes a jet bucket ring, and a ring-like vertical flange spaced radially outwardly from and circumferentially surrounding the jet bucket ring; in which the horizontal jet spray means on the rotating head includes a series of circumferentially equally spaced generally horizontally extending jet openings formed through the jet bucket ring, and a series of circumferentially equally spaced generally horizontally extending jet openings formed through the vertical flange; in which the stationary head includes a stationary horizontally extending jet arm; in which the horizontal jet means on the stationary head includes at least a pair of jet openings in said jet arm directed in opposite horizontal directions; in which the vertical jet spray means on the stationary head includes at least a pair of generally extending jet openings; and in which the vertical jet spray means through a central portion of the rotating head includes a series of at least three circumferentially spaced generally vertically extending jet openings through said central portion.

13. Dental bowl flusher construction as defined in claim 12 in which the jet openings in the rotating head jet bucket ring are angled from a straight radial line in one circumferential direction; and in which the jet openings in the rotating head flange are angled from a straight radial line in a circumferential direction opposite from said one circumferential direction.

14. Dental bowl flusher construction as defined in claim 12 in which the rotating head has a generally conical upper surface and a central dome having an undersurface spaced above said conical surface; in which the series of jet openings of the vertical jet spray means through a central portion of the rotating head each opens spaced beneath said dome undersurface; and in which the water flowing through the rotating head vertical jet spray means flows through said vertical jet openings and against said dome undersurface, is deflected by said dome undersurface radially outwardly and flows downwardly over said conical upper surface.

15. Dental bowl flusher construction as defined in claim 4 in which the stationary head includes a stationary generally horizontally extending jet arm; in which the horizontal jet means on the stationary head includes at least a pair of horizontal jet openings directed in opposite horizontal directions in the jet arm; in which the rotating head includes a ring-like vertical flange; in which the horizontal jet spray means on the rotating head includes a series of circumferentially equally spaced generally horizontally extending jet openings through the rotating head vertical flange; in which the rotating head has a generally horizontally extending bottom plate normally spaced below and extending horizontally beneath the stationary head jet arm; and key slot means formed in said rotating head bottom plate having dimensions enlarged from the stationary head jet arm so that the rotating head may be removed vertically upwardly from the stationary head by aligning the rotating head key slot with the stationary head jet arm.

References Cited
UNITED STATES PATENTS

| | | | |
|---|---|---|---|
| 604,692 | 5/1898 | Clark | 4—264 |
| 633,125 | 9/1899 | Davis | 4—264 |
| 652,958 | 7/1900 | Fraser | 4—264 |
| 1,985,533 | 12/1934 | Callender | 4—264 |

HAROLD J. GROSS, *Primary Examiner.*